United States Patent [19]

Carter

[11] Patent Number: 4,504,088
[45] Date of Patent: Mar. 12, 1985

[54] LIFTING DEVICE

[76] Inventor: Donald Carter, 21 Kelvedon Green, Kelvedon Hatch, Brentwood, Essex, England

[21] Appl. No.: 442,241

[22] Filed: Nov. 17, 1982

[30] Foreign Application Priority Data

Nov. 18, 1981 [GB] United Kingdom ............ 8134801
Jul. 21, 1982 [GB] United Kingdom ............ 8221045

[51] Int. Cl.³ ............................................. B66C 1/04
[52] U.S. Cl. .................................. 294/65.5; 271/18.1
[58] Field of Search ............... 294/64 R, 65.5, 88; 271/18.1, 193, DIG. 3; 335/285, 289, 291–294, 303; 414/744 C

[56] References Cited

U.S. PATENT DOCUMENTS

| 2,417,762 | 3/1947 | Koller | 294/65.5 |
| 2,970,002 | 1/1961 | Laviano | 294/65.5 |
| 2,970,003 | 1/1961 | Heath et al. | 294/65.5 |
| 2,976,075 | 3/1961 | Budreck | 294/65.5 |

FOREIGN PATENT DOCUMENTS

| 929300 | 6/1955 | Fed. Rep. of Germany | 294/65.5 |
| 1094296 | 12/1967 | United Kingdom | 294/65.5 |
| 742336 | 6/1980 | U.S.S.R. | 294/65.5 |
| 823120 | 4/1981 | U.S.S.R. | 294/65.5 |
| 844269 | 7/1981 | U.S.S.R. | 294/65.5 |

Primary Examiner—Johnny D. Cherry

[57] ABSTRACT

A lifting device which can be used singly or in multiples to lift magnetically attractable material comprises a magnet having the operating surface covered by a non-magnetic contact member to form a fluid tight chamber therebetween, the operating surface being contiguous with the contact member when lifting an article and air under pressure being introduced into the chamber to move the magnet and contact member relatively apart to release the article therefrom.

5 Claims, 4 Drawing Figures

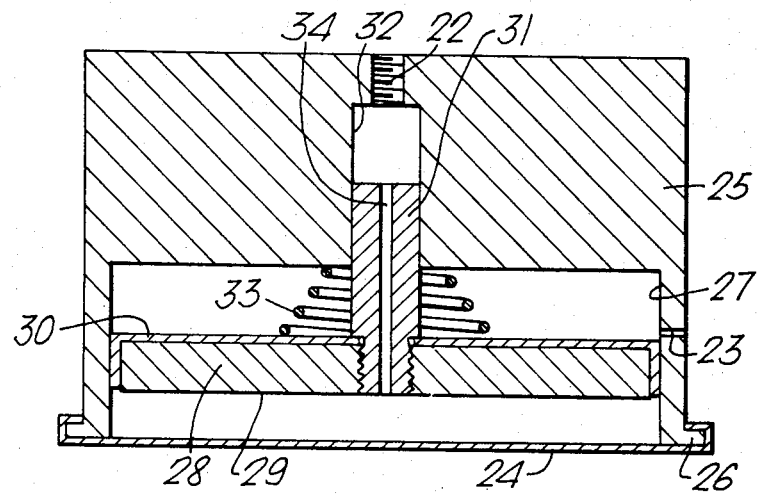
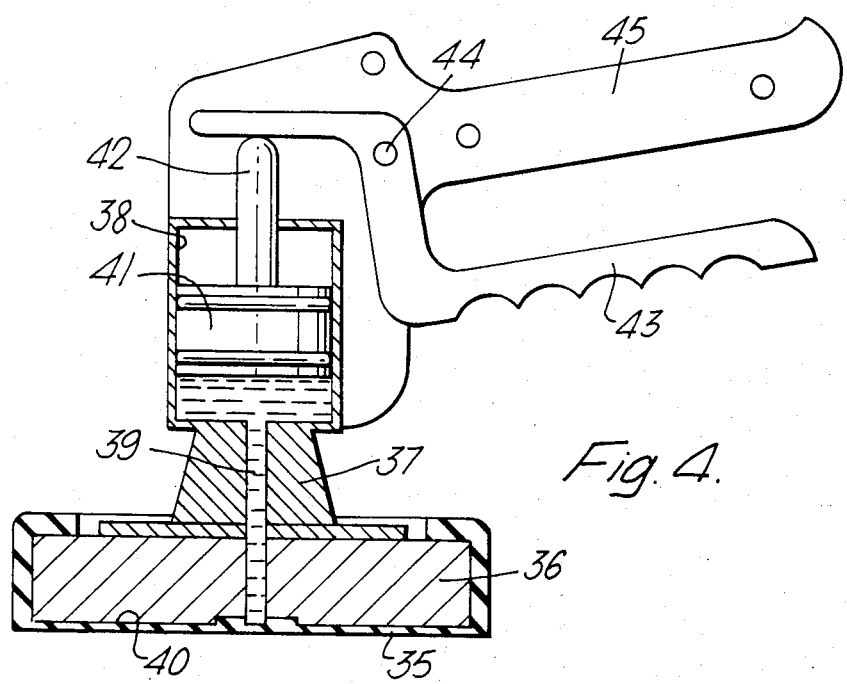

LIFTING DEVICE

This invention relates to lifting devices and particularly to lifting devices for lifting magnetically attractable articles.

A conventional way of lifting sheets of steel is by means of suctions pads, the suction being created by causing air to flow over a venturi. This is noisy, wasteful of air and the drop in pressure in the pad when the air flow over the venturi is stopped takes an inconveniently long time to fall to a value such that the sheet is released.

It has also been proposed in U.S. Pat. No. 2,976,075 to provide a magnetic lifting device in which a permanent magnet is mounted within a housing having at one end a flux concentrating mild steel ring, the magnet being shifted manually from an advanced position in which it is within the ring and the ring assumes the polarity of one face of the magnet and a retracted position in which the ring loses its polarity. A spring urges the magnet from the advanced position towards the retracted position with a force in excess of that required to move the magnet away from the article being lifted.

In U.S. Pat. No. 2,417,762 it is proposed to provide a tool for magnetic lifting in which a magnet is movable within a housing by means of a rod attached at one end to the magnet, the other end of the rod extending beyond the housing to be actuated manually.

In U.S. Pat. No. 2,970,003 a magnetic device has a plurality of magnets mounted on non-magnetic plate movable within a housing by a hand operable lever mechanism connected to the plate by a shaft.

According to the present invention there is provided a lifting device for lifting magnetically attractable material comprising a magnet having an operating surface, a non-magnetic contact member covering the operating surface of the magnet to form a substantially fluid tight chamber between the operating surface and the contact member, fluid passage means communicating with the fluid chamber and adapted to be connected to a source of fluid under pressure to move the contact member relative to the operating surface from a first position contiguous with the operating surface to a second position away from the operating surface. To release the article from the lifting device fluid under pressure is introduced into the chamber to move the contact member and the operating surface of the magnet relatively apart until the weight of the article overcomes the magnetic attraction of the magnet. Articles do not directly engage with the operating surface of the magnet so that damage both to the magnet and the articles to be lifted can be minimised. Because there is no direct contact between articles being lifted and a magnetised part of the lifting device the displacement of the contact member relative to the operating face ensures that all articles or foreign bodies however small are released.

The lifting device of the present invention can be readily connected, eg by a flexible pipe, to a source of fluid under pressure via an operating valve to enable the device to be operated remotely. Furthermore the device of the present invention is particularly suitable for use in a lifting head for lifting large or awkwardly shaped articles such as a sheet of metal comprising a plurality of lifting devices. Valve means can be provided to connect each of the lifting devices simultaneously to a source of fluid under pressure and effect simultaneous release of the article being carried from each of the lifting devices so that the lifting head can be used to accurately place the article.

Yet another advantage of a lifting device according to the invention is that the height of the device can be small so that the device can be used to lift articles in confined positions.

A fluid release passage can be provided through which fluid is released when the contact member is in the second position to limit the movement thereof relative to the operating surface of the magnet. The fluid release passage can comprise a pressure release valve. Fluid can thus be connected to the fluid chamber at a pressure sufficient to effect rapid relative movement, and hence accuracy of operation, without creating an excessive pressure in the fluid chamber.

In one embodiment of the present invention the non-magnetic contact member is formed of a resilient material, the contact member being expandable under fluid pressure to increase the volume of the chamber and move the contact member to the second position. In such an embodiment the fluid release passage can comprise a passage in the contact member, the size of the passage increasing as the contact member expands to the second position. A resilient contact member can provide improved protection of the operating face of the magnet as compared to a rigid contact member but the wearing properties may be less satisfactory depending upon the nature of the articles being lifted. When the fluid pressure is removed the resilient contact member will return to the first position by the resilience of the material.

In another embodiment of the present invention a lifting device can comprise a non-magnetic housing having an axial bore one end of which is closed by the non-magnetic contact member and the magnet being slidable within the bore to move the contact member relative to the operating surface of the magnet between the first and second positions. In such an embodiment the fluid release passage can comprise a passage through the housing and communicating with the substantially fluid tight chamber when the magnet is in the second position. The contact member can comprise a rigid hardwearing material to withstand repeated contact with the articles being lifted and the thickness can be chosen to minimise the loss of magnetic attraction in accordance with the wearing properties required.

Depending upon the orientation of the lifting device the slidable magnet may return to the first position by gravity but this return can be assisted if necessary by a return spring.

Preferably the fluid is air which can be supplied from any convenient source via an appropriate control valve.

In another form of lifting device there can be provided an operating handle connected to a piston slidable within a cylinder, and a fluid connection between said cylinder and the fluid passage, operation of the handle transferring fluid between the cylinder and the chamber. There is thus provided a self contained lifting device which can be lifted and operated manually.

The magnet is preferably a permanent magnet but an electro-magnet can be employed in which event a switch mechanism to energise and de-energise the magnet to engage and release articles from the device is not necessary.

The invention will now be more particularly described with reference to the accompanying diagrammatic drawings in which:

FIG. 3 is a sectional side elevation of an alternative embodiment of lifting device having a rigid contact member; and FIG. 4 is a sectional elevation of a manually operated lifting device according to the invention.

Figure 1:
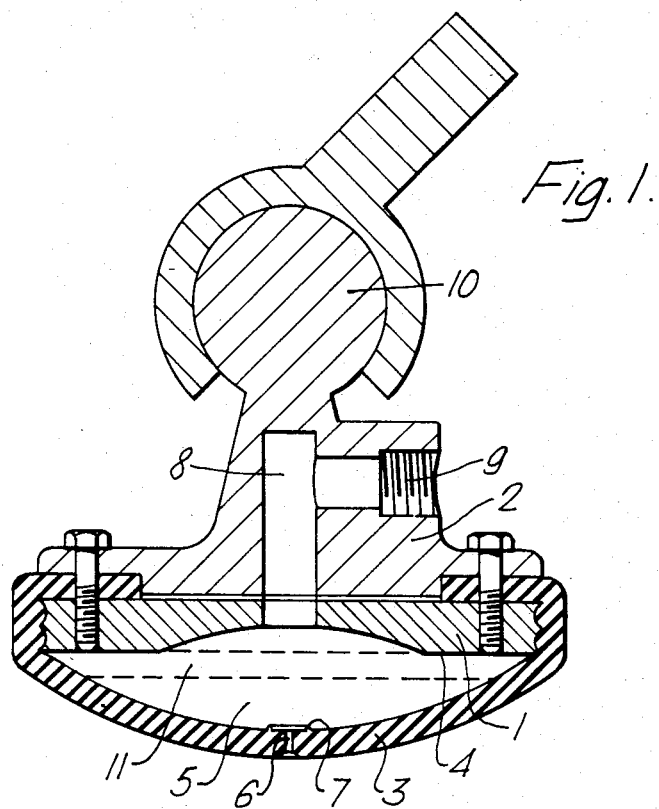
FIG. 1 is a sectional side elevation of a first embodiment of lifting device having a resilient contact member.

Referring to FIG. 1 the lifting device comprises a powerful permanent magnet 1 secured to a housing 2 of non-magnetic material—conveniently aluminum. An oil resistant resilient contact member 3 of rubber or synthetic plastics material is clamped between the housing 2 and magnet to extend across and cover the operating face 4 of the magnet forming a fluid tight chamber 5 therebetween. The contact member also serves to protect the magnet from damage which may be particularly advantageous when the magnet is of ferrite or rare earth cobalt types which have a tendency to brittleness. A fluid release passage 6 through the contact member is surrounded by an upstanding annular rib 7.

A passage 8 extends through the housing and magnet to communicate at one end with the chamber 5, the other end of the passage being adapted, eg by a thread 9, to be connected with a source of air under pressure via a control valve (not shown). The housing is provided at 10 with attachment means for attaching the lifting device to suitable crane mechanism or the like.

In the position as shown in FIG. 1 the contact member is in the second position relative to the operating surface of the magnet stretched away from the magnet by air in the chamber 5. The fluid release passage 6 is expanded to allow excess fluid to be released and limit the expansion of the contact member. The annular rib 7 minimises any tendency of the passage 6 initiating tearing of the contact member.

When the device is used the contact member is brought into engagement with the article to be lifted with the contact member in the first position shown at 11 in FIG. 1, contiguous with the operating face 4. The magnetic attraction of the magnet 1 secures the article to the device. When the article is to be released air is supplied to the chamber 5 to stretch the contact member as shown in FIG. 1 whereby the article is moved a distance away from the magnet such that the weight of the article exceeds the magnetic attraction and the article is released from the device. In the expanded condition the escape of fluid through the release passage 6 also assists in releasing articles from the device and any swarf or filings from the contact member.

Figure 2:
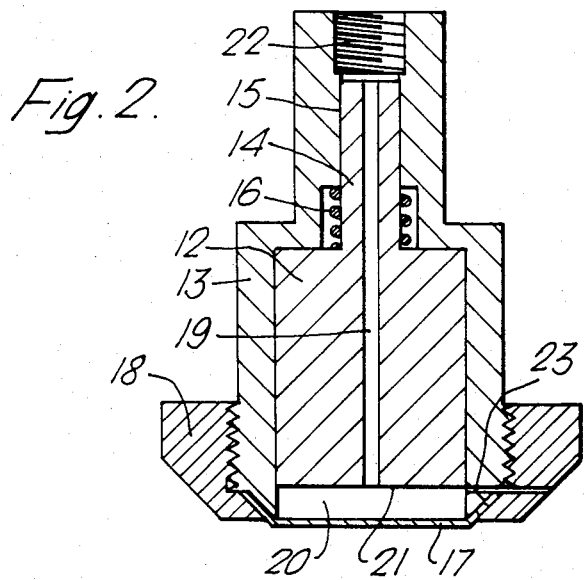
FIG. 2 is a view similar to FIG. 1 of a lifting device having a rigid contact member.

When the air pressure in the chamber is released the contact member returns to the first position. To assist in the return of the contact member to the first position the contact member can be stretched in the first position. Instead of the fluid release passage 6 a relief valve can be incorporated in the air supply to limit the pressure applied to the chamber and hence the stretching of the contact member in the second position.

Where materials to be lifted, or chemicals are used which are not compatible with the rubber or other flexible materials, or where the surface of the articles to be lifted is rough or hot, the alternative embodiment of FIG. 2 may be employed. As shown in FIG. 2 the lifting device comprises a permanent magnet 12 slidably mounted within a housing 13. The magnet has a reduced portion 14 sliding within a corresponding bore 15 of the housing and a return spring 16 urges the magnet away from the second position as illustrated.

A contact member 17 eg of brass of other like rigid non-magnetic material is secured across the open end of the housing 13 by a ring nut 18. An air passage 19 extends through the magnet so as to communicate with the chamber 20 defined between the contact member 17 and the operating face 21 of the magnet 12. The housng is adapted at 22 to be connected to a source of air under pressure.

In operation the device is brought into contact with the article to be lifted with the operating face 21 contiguous with the contact member. The article is magnetically attached to the device and to release the article air is passed to the chamber 20 causing the magnet to slide in the housing and move the operating face 21 to the second position as shown spaced away from the contact member. An air bleed 23 can be provided from the chamber 20 which is uncovered by the magnet as it reaches the second position to prevent an overpressure in the chamber which might damage the contact member.

Referring now to FIG. 3 there is shown a second embodiment having a rigid contact member 24 of brass which is secured to a housing 25 by forming, eg by spinning, around a flange 26 at the open end of the housing. Within the bore 27 of the housing is a permanent magnet 28 having a large operating surface 29 but which is relatively thin. The magnet 28 is secured within a shroud 30 of plastics material which is a fluid tight sliding fit within the bore 27. A shaft 31 secured centrally of the magnet 28 fits within a reduced bore 32 of the housing to minimise any tendency of the magnet to tilt within the bore 27. A spring 33 urges the magent to the first position in which the operating surface 29 is contiguous with the contact member. An air passage 34 extends through the magnet and the housing is adapted at 22 as before to be connected to a source of air under pressure. A fluid release passage 23 is uncovered when the magnet reaches the second position. This embodiment provides a lifting device of economical height which is particularly convenient for use in confined situations.

The device shown in FIG. 4 is a further embodiment similar to that of FIG. 1 in which a resilient contact member 35 is secured to a permanent magnet 36. Within a housing 37 attached to the magnet is a cylinder 38 one end of which communicates with a passage 39 passing through the magnet to terminate in the operating face 40 thereof. Slidable within the cylinder is a piston 41 having a piston rod 42 the end of which contacts an operating handle 43 pivoted at 44. A fixed handle 45 is formed by a suitable shaped extension of the housing 37. Pivotal movement of the operating handle 43 from the position shown towards the fixed handle pushes the piston within the cylinder to force air through the passage 39 to stretch the resilient contact member away from the operating face of the magnet as before. Thus the device of FIG. 4 is self contained and can be constructed light enough to be carried and operated by hand.

Alternatively a hand held lifting device according to the invention can be supplied with air under pressure from an external source via a flexible supply line and an appropriate air valve. In yet a further embodiment a hand held lifting device can be provided with a cylinder of compressed air connected to the chamber by an appropriate valve, such a device being self-contained.

Whilst the invention has been described with reference to the use of permanent mgnets it will be understood that electro-magnets can also be employed. Whereas electro-magnets as previously employed have required switch mechanisms to energise and de-energise the magnet in order to engage and release articles that mechanism is not necessary in the constructions according to the present invention since the magnet can be energised the whole time the device is being used.

A plurality of lifting devices such as have been described with reference to FIGS. 1 to 3 can be incorporated in a lifting head eg for lifting flat or shaped sheets of metal. In such a head each lifting device is supplied with fluid under pressure by a common actuating valve so that the article is released simultaneously from each device.

I claim:

1. A lifting device for lifting magnetically attractable material comprising a magnet having an operating surface, a non-magnetic contact member covering the operating surface of the magnet to form a substantially fluid tight chamber between the operating surface and the contact member, fluid passage means communicating with the fluid chamber and adapted to be connected to a source of fluid under pressure to move the contact member relative to the operating surface from a first position contiguous with the operating surface to a second position away from the operating surface, and a fluid release means through which fluid is released when the contact member is in the second position to limit said relative movement.

2. A lifting device according to claim 1 in which the non-magnetic contact member is formed of a resilient material, the contact member being expandable under fluid pressure to increase the volume of the chamber and move the contact member to said second position.

3. A lifting device according to claim 2 in which the fluid release passage comprises a passage in the contact member, the size of the passage increasing as the contact member expands to the second position.

4. A lifting device according to claim 1 comprising a non-magnetic housing, having an axial bore one end of which is closed by the non-magnetic contact member and the magnet being slidable within the bore to move the contact member relative to the operating surface of the magnet between the first and second positions.

5. A lifting device according to claim 4 in which the fluid release means comprises a passage through the housing and communicating with the substantially fluid tight chamber when the magnet is in the second position.

* * * * *